United States Patent

[11] 3,548,923

[72] Inventors Kazuhiro Nakano
Neyagawa-shi,
Kouichiro Yamaguchi, Osaka, Utsunomiya,
Kunihiko, Kadoma-Shi; Shigeru Tanimoto,
Nara-Shi, Japan
[21] Appl. No. 781,856
[22] Filed Dec. 6, 1968
[45] Patented Dec. 22, 1970
[73] Assignee Matsushita Electric Industrial Co., Ltd.
Osaka, Japan
a corporation of Japan
[32] Priority Dec. 11, 1967, June 11, 1968, June 12, 1968
[33] Japan
[31] Nos. 42/80517, 43/40693 and 43/50339

[54] COOLING AND HEATING APPARATUS OF HEAT STORAGE TYPE
12 Claims, 17 Drawing Figs.
[52] U.S. Cl. ................................................ 165/18,
165/29, 62/139
[51] Int. Cl. .................................................. F24d 11/00
[50] Field of Search .......................................... 165/29, 30,
18, 22, 50; 62/139

[56] References Cited
UNITED STATES PATENTS
| 1,874,803 | 8/1932 | Reed | 165/29 |
| 1,935,281 | 11/1933 | Reed | 165/29 |
| 2,973,630 | 3/1961 | Kriechbaum | 62/139 |

Primary Examiner—Charles Sukalo
Attorney—Stevens, Davis, Miller & Mosher

ABSTRACT: A cooling and heating apparatus of the heat storage type which is so designed that an off-peak time is utilized to store the cooling and heating energy thereby to effect the cooling and heating as required. In the apparatus, a refrigerating machine, a heater and a heat storage vessel containing a heat-storing agent are assembled as a unit so that the heat-storing agent is cooled by the refrigerating machine during the cooling for storing the cooling energy in the form of latent heat and is heated by the heater during the heating for storing the heating energy in the form of sensible heat.

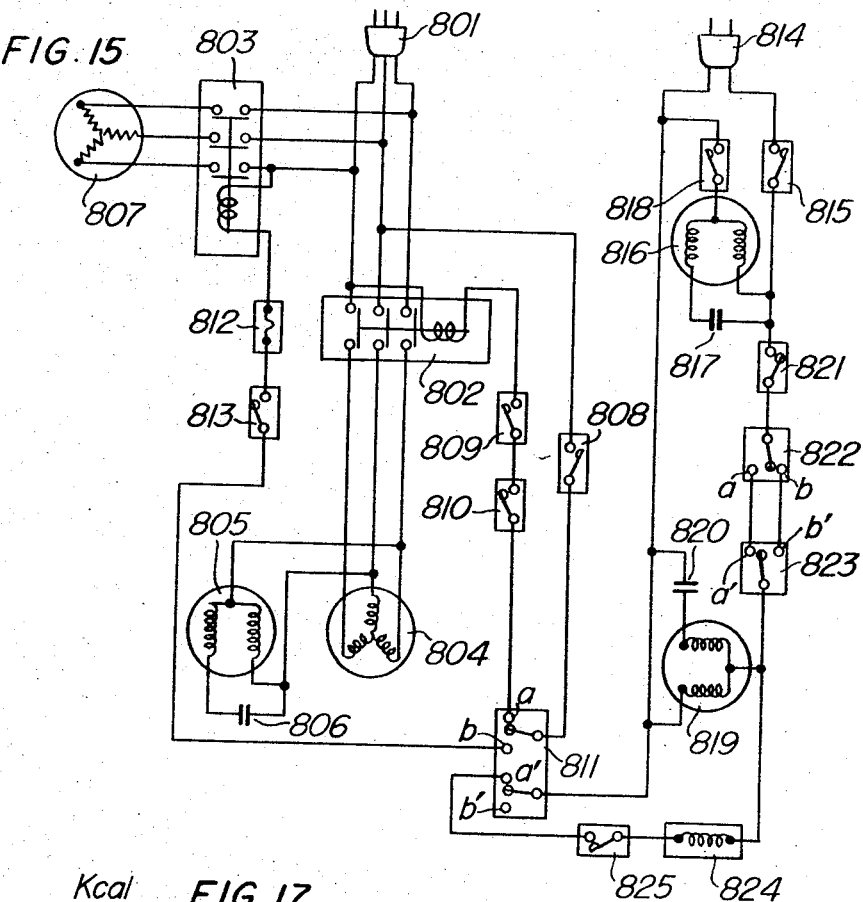
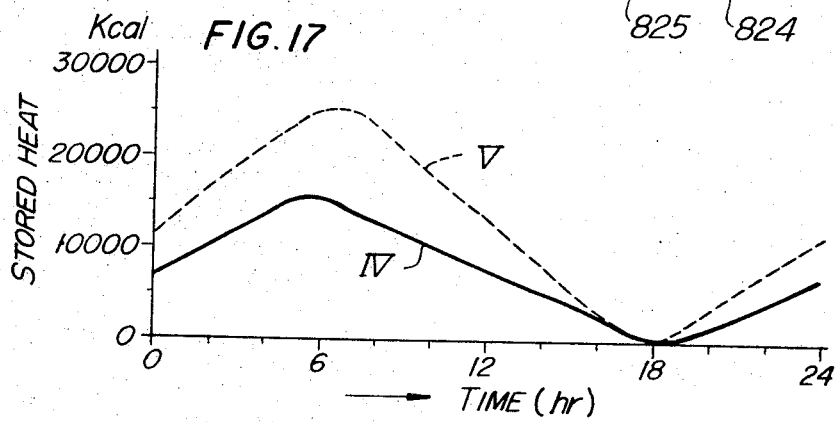

3,548,923

COOLING AND HEATING APPARATUS OF HEAT STORAGE TYPE

This invention relates to a cooling and heating apparatus and more particularly to a cooling and heating apparatus of the heat storage type which is so designed that a heat-storing agent is cooled by a refrigerating machine during the cooling operation for storing the cooling energy principally in the form of latent heat and the heat-storing agent is heated by heating means such as a heater during the heating operation for storing the heating energy in the form of sensible heat.

Prior art central cooling and heating apparatus for domestic use have not been adapted to operate with a heat storage system in that they commonly employ the combination of a water cooler and a water heater and these devices are operated solely when cooling and heating are required. On the other hand, large-capacity air conditioners for buildings employ frequently a cooling and heating apparatus based on a heat storage system, but any cooling and heating apparatus of this kind which is of a sufficiently small size for domestic use has not yet been proposed. Furthermore, a central cooling and heating apparatus capable of cooling and heating the whole space throughout a house has involved certain disadvantages in respect of the limit of power receiving capacity, difficulty of installation, expensiveness of the apparatus, etc. This is mainly due to the fact that the prior art apparatus is quite bulky in size and includes large-sized equipment therein since the apparatus is designed to possess a maximum capacity so as to endure a maximum cooling and heating load. A storage heater or what is called a block heater of the type employing bricks as a heat-storing agent has been proposed hitherto. In this heater, the bricks are heated by a heater in the nighttime for storing heat therein so that the heat stored in the bricks can be discharged during the daytime. However, the block heater has been unsatisfactory in that it is quite heavy and does not possess any cooling function.

The present invention contemplates overcoming the above drawbacks involved in the prior art central cooling and heating apparatus as well as the block heater and to apply the idea of heat storage employed in a large-sized air conditioner for buildings to a small-sized air conditioner for domestic use.

It is an object of the present invention to provide a novel cooling and heating apparatus of the heat storage type in which a refrigerating machine and a heater of small capacity can handle a cooling and heating load of larger capacity and which can endure, with a sufficient margin, the cooling and heating load which varies continuously depending on time, weather and other conditions.

Another object of the present invention is to provide a cooling and heating apparatus of the heat storage type which is featured by the arrangement of the evaporator in the refrigerating machine so that a heat exchanger for heat storage is operated for storing any surplus portion of the cooling load when the cooling load is small relative to the output of the refrigerating machine, and a heat exchanger for water cooling is operated for discharging the stored output portion in addition to the output of the refrigerating machine when the cooling load is large relative to the output of the refrigerating machine, whereby the refrigerating machine can always develop its maximum function.

A further object of the present invention is to provide a cooling and heating apparatus of the heat storage type in which the heat exchange efficiency is not lowered in any of the heat exchange stages between an internal heat exchanger, or a heater and a heat-storing agent as well as between the internal heat exchanger or a heater and a heat transfer medium which serves to transfer heat to an indoor fan coil unit, in which no special heat exchanger need be provided for the heat exchange between the heat-storing agent and the heat transfer medium, and which can employ an inexpensive and readily available heat transfer medium.

Still another object of the present invention is to provide a cooling and heating apparatus of the heat storage type in which the position of a heat transfer medium suction pipe within a heat storage vessel is set so that the heat transfer medium can unobstructedly and easily be conveyed to an indoor fan coil unit even in the stage in which the output of the refrigerating machine is being stored.

A yet further object of the present invention is to provide a cooling and heating apparatus of the heat storage type in which an antifreeze thermostat is mounted on the heat transfer medium suction pipe in order to prevent damage to the heat storage vessel and to avoid clogging of the heat transfer medium circulating path even when the output of the refrigerating machine is stored in an excessive amount.

Another object of the present invention is to provide a cooling and heating apparatus of the heat storage type in which a thermostat for sensing the temperature of the heat transfer medium leaving the fan coil unit is especially provided so that the heat exchanger for heat storage is operated to store heat when the temperature of the heat transfer medium is low and the heat exchanger for water cooling is operated when the temperature of the heat transfer medium is high so as to cool the heat transfer medium to a greater degree thereby to ensure more effective heat exchange between the refrigerating machine and the heat transfer medium.

A further object of the present invention is to provide a cooling and heating apparatus of the heat storage type in which means are provided to suitably effect the changeover between the heat exchanger for heat storage and the heat exchanger for water cooling so that the heat exchanger for water cooling is operated to increase the cooling capacity when a circulating pump for feeding the heat transfer medium to the fan coil unit is in operation to deal with a specific cooling load, and the heat exchanger for heat storage is operated when the circulating pump is not in operation so as to evaporate the refrigerant at low temperature and to store the output of the refrigerating machine thereby to prepare for a high cooling load.

Other objects, features and advantages of the present invention will be readily apparent from the following detailed description of certain preferred embodiments taken in conjunction with the accompanying drawings, in which:

FIG. 15 is an electrical circuit diagram of a further embodiment of the present invention;

FIG. 17 is a graph showing the quantity of heat stored during the cooling operation relative to time in the embodiment shown in FIG. 15.

The present invention provides a cooling and heating apparatus which comprises in combination a refrigerating machine, a heater, a heat storage vessel, a fan coil unit and a pump, and is provided with the function of storing the output from the refrigerating machine or from the heater. The structure and operation of the cooling and heating apparatus of the heat storage type according to the present invention will now be described in detail with reference to the drawings.

Figure 1:
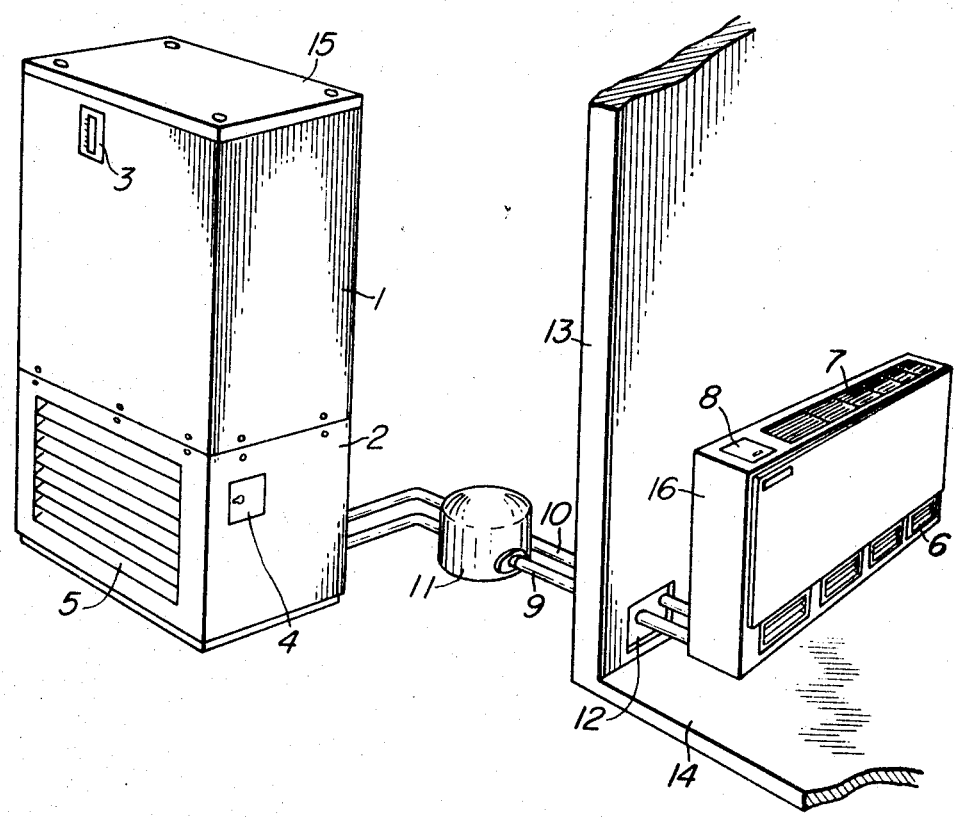
FIG. 1 is a perspective view showing the arrangement of units in an embodiment of the cooling and heating apparatus of the heat storage type according to the present invention.

Referring to FIG. 1 showing the general arrangement of various units forming the apparatus, a heat storage section 1 and a refrigerator section 2 are integrally combined together to constitute a cooling and heating unit 15. The cooling and heating unit 15 is generally disposed outdoors. The cooling and heating unit 15 is equipped with accessories such as a liquid level gauge 3, an actuating portion 4 and a front louver 5. The cooling and heating unit 15 has a structure which will be described in detail later. A known fan coil unit 16 is disposed indoors and has a conventional structure comprising a tubular heat exchanger for circulating cold water or hot water therethrough and a fan means. Therefore, any detailed description as to the structure of the fan coil unit 16 will not be given herein. The fan coil unit 16 in FIG. 1 is provided with indoor air suction ports 6, air discharge ports 7 and an actuating portion 8. The cooling and heating unit 15 is connected with the fan coil unit 16 by thermally insulated conduits 9 and 10. A circulating pump 11 is interposed midway of the supply conduit 9 so as to convey cold water or hot water stored within the cooling and heating unit 15 to the fan coil unit 16. The cold water or hot water having been subjected to heat exchange with indoor air returns to the cooling and heating unit 15 by way of the return conduit 10. The conduits 9 and 10 comprise a rubber hose of material such as butyl rubber or a steel pipe which is wrapped in a thermally insulating material such as soft foamed urethane or glass fibers. The conduits 9 and 10 pass through a fenestella or small port 12 disposed in a part of a wall or floor to extend into the room for connection with the fan coil unit 16. In FIG. 1, a wall 13 and a floor 14 are shown by way of example. While a single fan coil unit 16 is shown in FIG. 1, a plurality of such fan coil units 16 may be provided depending on the capacity of the cooling and heating unit 15 and on the required cooling and heating load. The circulating pump 11 may be built integrally in the cooling and heating unit 15 by providing a recess in the wall of the unit 15. In the detail views of the cooling and heating unit 15 shown in FIGS. 2 to 4, the circulating pump 11 is not integrally built in the cooling and heating unit 15.

Figure 2:
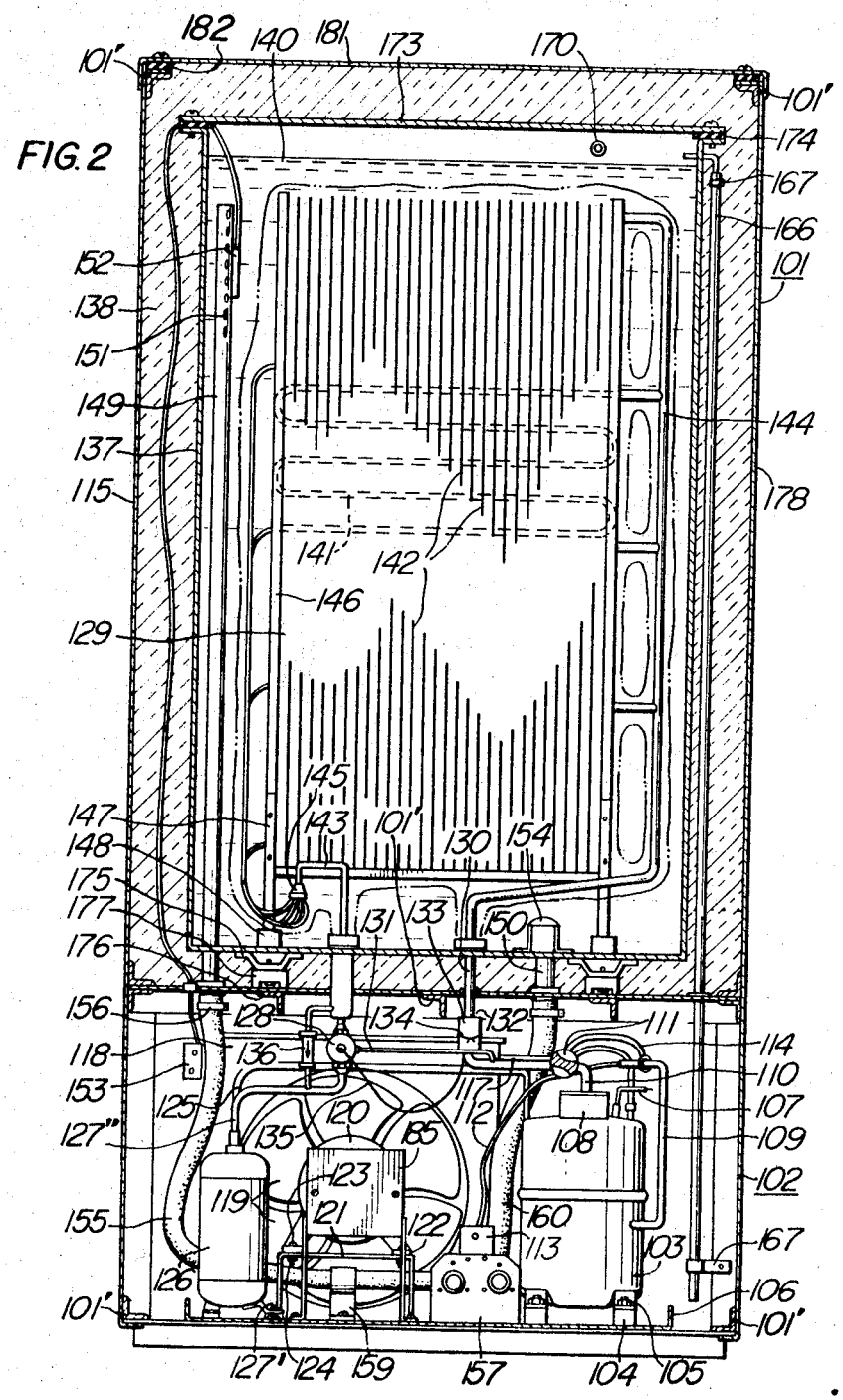
FIG. 2 is a vertical sectional front elevational view of a heat storage section and a refrigerator section in the apparatus shown in FIG. 1.
Figure 3:
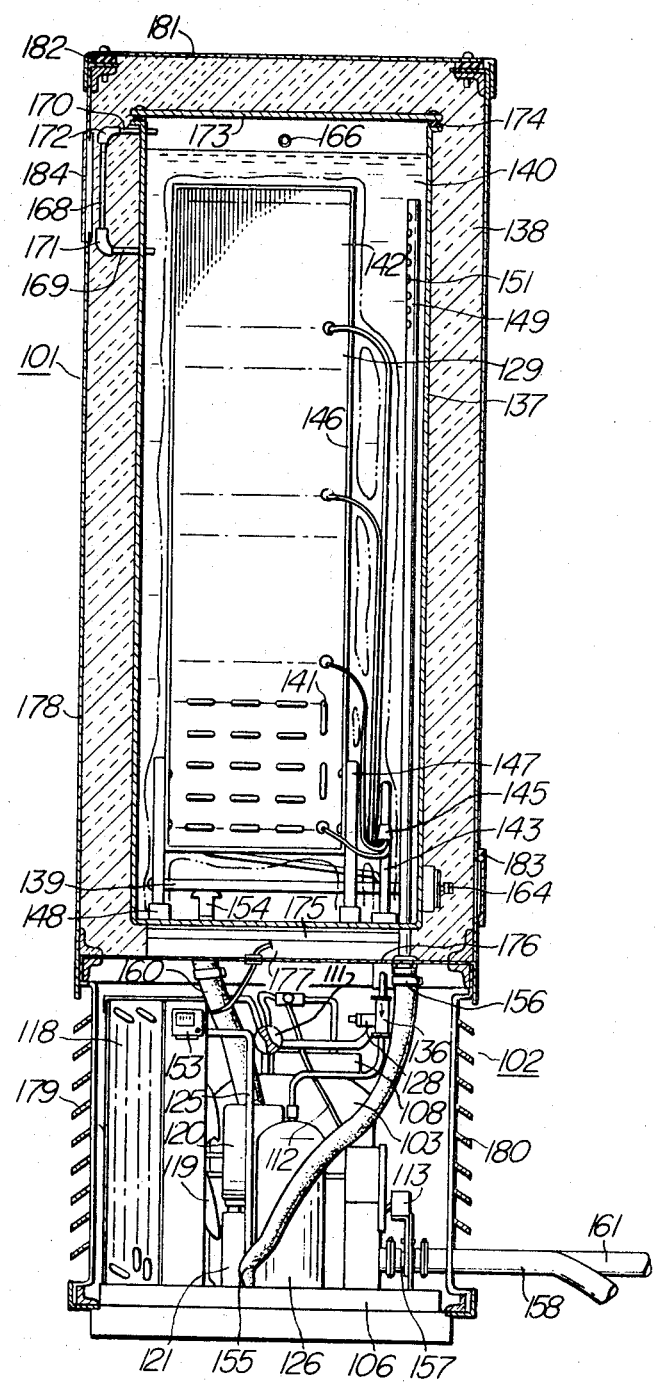
FIG. 3 is a vertical sectional side elevational view of FIG. 2.
Figure 4:
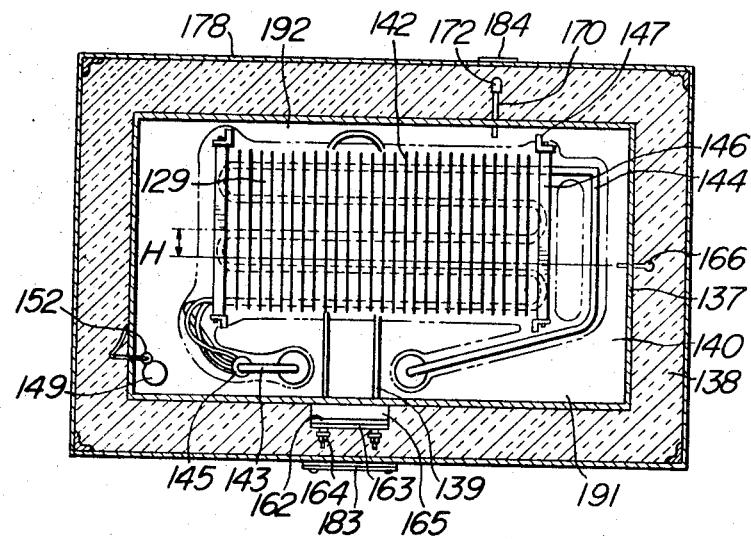
FIG. 4 is a cross-sectional view of the heat storage section shown in FIG. 2.

Referring to FIGS. 2 to 4, the cooling and heating unit which is designated by the reference numeral 115 comprises substantially an upper section and a lower section, that is, a heat storage section 101 and a refrigerator section 102. However, it will be understood that the positional relation of these sections may be reversed or these sections may be separately disposed and connected with each other by a refrigerant conduit.

Angle bars 101' of steel constitute the frame of the heat storage section 101 and the refrigerator section 102, and a plurality of angle bars 101' are used at a part at which the heat storage section 101 is supported on the refrigerator section 102.

In the refrigerator section 102, an electrically-driven reciprocating compressor 103 is fastened to a base 106 by nuts 105 through cushion rubber blocks 104 interposed therebetween. A refrigerant charging port 107 is sealed off at its charging end after the refrigerant has been charged. A terminal box 108 is disposed above the compressor 103. A discharge pipe 109 and a suction pipe 110 for a refrigerant are connected with a four-way solenoid valve 111. A capillary tube 112 connects an intermediate point of the discharge pipe 109 on the upstream side of the four-way solenoid valve 111 with a high-pressure switch 113. The high-pressure switch 113 acts to automatically stop the operation of the compressor 103 when the pressure within the discharge pipe 109 exceeds a predetermined setting in the event that a high pressure is developed for some cause during the refrigerating cycle. Thus, the high-pressure switch 113 protects the refrigerant piping from breakage. The four-way valve 111 is operative to change over the refrigerant path between the refrigerating cycle and the heat pump cycle. In the refrigerating cycle, the gaseous refrigerant at high temperature and pressure leaving the compressor 103 passes through pipes 114 and 117 to enter an external heat exchanger 118 disposed outside of the heat storage section 101. In this case, the external heat exchanger 118, which may have a conventional platefin and tube construction, acts as a condenser and is forcedly cooled by a fan 119. The fan 119 is driven by a motor 120 which is fastened to a support 121 by bolts 123 and nuts 124 through cushion rubber blocks 122 interposed therebetween. The support 121 for the motor 120 is spot welded to the base 106. The gaseous refrigerant at high temperature and pressure leaving the compressor 103 is thus liquefied in the external heat exchanger 118 and is led through a pipe 125 into a liquid receiver 126 to be stored therein. The liquid receiver 126 is also fastened to the base 106 by setscrews 127. The liquid refrigerant leaving the liquid receiver 126 is led through a pipe 127' into a thermostatic expansion valve 128 in which the liquid refrigerant is throttled to be subject to a pressure drop and is then evaporated in an internal heat exchanger 129 disposed within the heat storage section 101, which will be described in detail later. The evaporated refrigerant absorbs heat from the environment and returns through the four-way valve 111 and the suction pipe 109 into the compressor 103 to complete one cycle. The expansion valve 128 shown in FIGS. 2 and 3 is of the external equalizer type and is equipped with an external equalizer pipe 131. The expansion valve 128 has a temperature sensing element 132 which is mounted on an outlet pipe 130 of the internal heat exchanger 129. In order to minimize the influence of external air temperature, a mass of thermally insulating material 133 covers the temperature sensing element 132 and is bound to the latter by a string 134. The temperature sensed by the temperature sensing element 132 is transmitted in the form of a pressure to the expansion valve 128 by way of a capillary tube 135 for controlling the flow of refrigerant so as to continuously properly maintain the refrigerating capacity.

On the other hand, in the heat pump cycle, the four-way solenoid valve 111 is turned to a different operative position. In such a position of the four-way valve 111, the gaseous refrigerant leaving the compressor 103 is led first into the internal heat exchanger 129 to discharge heat possessed thereby and to be liquefied. The liquid refrigerant is then led through a check valve 136, the liquid receiver 126 and the pipe 125 into the external heat exchanger 118. Before being led into the external heat exchanger 118, the liquid refrigerant is throttled by an expansion valve (not shown) to be subject to a pressure drop and is evaporated within the external heat exchanger 118. It will thus be understood that the heat exchanger 118 which has worked as a condenser in the refrigerating cycle acts now as an evaporator. The refrigerant evaporated in the heat exchanger 118 returns to the compressor 103 by way of the pipe 117, pipe 114, four-way valve 111 and suction pipe 110 in that order. The elements described above are principal components of the refrigerator section 102.

The heat storage section 101 comprises a heat storage vessel 137 which is surrounded by a block 138 of thermally insulating material such as glass wool and is disposed above the refrigerator section 102. The internal heat exchanger 129 described above and a heater 139 are contained within the heat storage vessel 137. A quantity of heat-storing agent 140 is filled within the heat storage vessel 137 up to a level higher than the top of the internal heat exchanger 129. The heat-storing agent 140 is commonly water, but a heat transfer medium consisting essentially of diphenylene oxide (sold under the trade name Dowtherm A by Dow Chemical Company), ethylene diamine or the like may be used in lieu of water. However, in the cooling and heating apparatus of the heat storage type according to the present invention, the heat-storing agent has preferably a large value of latent heat solidification since the latent heat of solidification of the heat-storing agent is utilized for the storage of heat during the cooling as described in detail later. As is commonly known, the latent heat of solidification of water at 0° C. is 80 kilocalories per kilogram, while that of Dowtherm A at 12° C. is 36 kilocalories per kilogram and that of ethylene diamine at 8.5° C. is 76.5 kilocalories per kilogram. In view of the above fact and considering the cost and availability, water is most preferable for use as the heat-storing agent.

Figure 5:
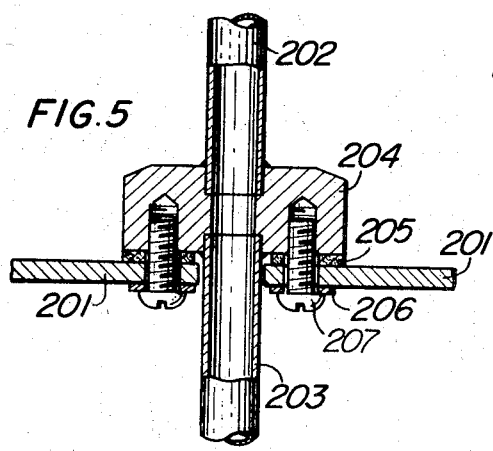
FIG. 5 is an enlarged sectional view of part of the apparatus, showing the manner of mounting a refrigerant inlet pipe and a refrigerant output pipe to the heat storage vessel.

As described with regard to the arrangement of the refrigerator section 102, the internal heat exchanger 129 acts as an evaporator during the refrigerating cycle and as a condenser during the heat pump cycle. The heat exchanger 129 may be of the bare tube type in which a tube is merely arranged to run in serpentine fashion, the aerofin-tube in which a ribbonlike fin is wrapped around a tube, the highfin-tube type or lowfin-tube type classified by the relative height of fins, or the like. However, the heat exchanger 129 shown in the drawings is of the so-called platefin-coil type having an improved heat exchange efficiency which comprises a plurality of tubes 141 arranged to run in serpentine fashion in a plurality of stages and a multiplicity of platefins 142 mounted on these tubes 141. A refrigerant inlet pipe 143, a refrigerant outlet pipe 144 (the relation therebetween being reversed in the case of the heat pump cycle), and a distributor 145 are disposed within the heat storage vessel 137. The distributor 145 divides the refrigerant path into a plurality of paths. The heat exchanger 129 has side plates 146 and is supported by legs 147 which are upstanding from supporting pedestals 148 welded to the inner bottom surface of the heat storage vessel 137. The refrigerant inlet pipe 143 and outlet pipe 144 are secured to the heat storage vessel 137 in a manner as shown in FIG. 5. Referring to FIG. 5, refrigerant conveying pipes 202 and 203 are coaxially welded to a support block 204 from above and from below, respectively. The support block 204 is provided with internally threaded holes so that setscrews 207 can be passed through washers 206, the bottom 201 of the heat storage vessel 137 and packings 205 into the threaded holes for fastening the support block 204 to the heat storage vessel 137 in fluidtight relation.

The heat storage vessel 137 further contains therein a heat transfer medium suction pipe 149 and a heat transfer medium discharge pipe 150 for conveying the heat transfer medium, which, in this invention is the heat-storing agent, to a fan coil unit 16. The suction pipe 149 is elongated so that it extends adjacent to the level of the heat transfer medium. The suction pipe 149 is provided at its upper part with a plurality of vertically spaced heat transfer medium suction ports 151. A temperature sensing element 152 of an antifreeze thermostat 153 is mounted adjacent to the suction ports 151 bored in the wall of the suction pipe 149.

Figure 6:
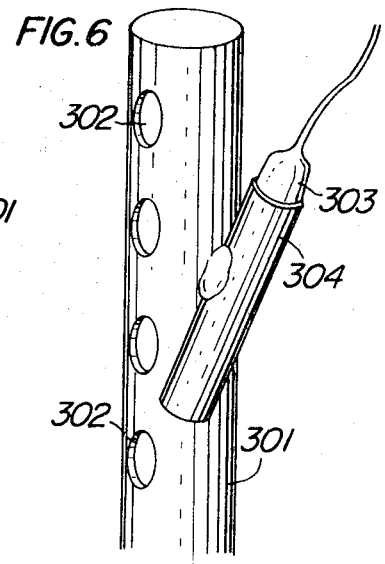
FIG. 6 is an enlarged perspective view showing the manner of mounting a temperature sensing element of an antifreeze thermostat to a heat transfer medium suction pipe.

More precisely, referring to FIG. 6, a plurality of heat transfer medium suction ports 302 are bored in the wall of a heat transfer medium suction pipe 301 so that the heat-storing agent 140 filled in the heat storage vessel 137 can be sucked through these suction ports 302 by the circulating pump to be fed into the fan coil unit 16 A temperature sensing element 303 of an antifreeze thermostat is provided adjacent to these suction ports 302 in order to prevent these suction ports 302 from being clogged by the heat-storing agent which may be frozen. The temperature sensing element 303 is filled therein-side with a gas such as Freon gas whose pressure is variable depending on the ambient temperature. The pressure variation thus taking place is transmitted to the antifreeze thermostat 153 shown in FIGS. 2 and 3 thereby to automatically stop the operation of the compressor 103. In FIG. 6, a protective tube 304 for the temperature sensing element 303 of the antifreeze thermostat 153 is spot welded to the sidewall of the suction pipe 301.

Figure 7:
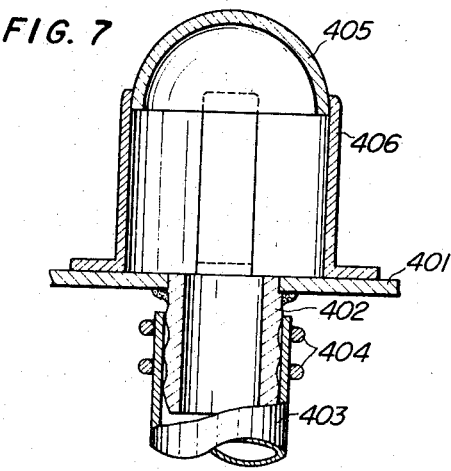
FIG. 7 is an enlarged sectional view of part of the apparatus, showing the manner of mounting a heat transfer medium discharge pipe to the bottom of the heat storage vessel.

In FIGS. 2 and 3, the heat transfer medium discharge pipe 150 is connected with the bottom of the heat storage vessel 137, and a baffle 154 is disposed above the upper end opening of the discharge pipe 150. More precisely, referring to FIG. 7, a heat transfer medium discharge pipe 402 is welded to the bottom 401 of the heat storage vessel 137 and has a corrugated finished outer surface. A flexible hose 403 is fitted on the discharge pipe 402 and is fastened to the discharge pipe 402 by a plurality of bands 404. A semispherical baffle 405 is supported by a plurality of support legs 406 which are welded to the bottom 401 of the heat storage vessel 137. The baffle 405 disposed in the path of the heat transfer medium returning from the fan coil unit 16 to enter the heat storage vessel 137 by way of the discharge pipe 402 is operative to disturb the otherwise streamline flow of the heat transfer medium so as to thereby cause turbulent motion of the heat transfer medium within the heat storage vessel 137.

Referring again to FIGS. 2 and 3, a flexible hose 155 is fitted on the lower end portion of the heat transfer medium suction pipe 149 at the outside of the heat storage vessel 137 and is fastened to the suction pipe 149 by a plurality of bands 156. The lower end of the flexible hose 155 is connected with a heat transfer medium supply pipe 158 through a hose joint 157. The flexible hose 155 is supported by a hose support member 159. Similarly, a flexible hose 160 connected with the heat transfer medium discharge pipe 150 is coupled to a heat transfer medium return pipe 161 through a hose joint 157. As described previously, the heat transfer medium supply pipe 158 is connected with the fan coil unit 16 through the circulating pump 11, while the heat transfer medium return pipe 161 is directly connected with the fan coil unit 16.

Referring to FIGS. 3 and 4, the heater 139 is inserted into the heat storage vessel 137 from the rear sidewall of the vessel 137. The heater 139 is equipped with a heater packing 162, a heater flange 163 and heater terminals 164. A mounting member 165 for the heater 139 is integral with the heat storage vessel 137. The heater 139 is situated beneath the internal heat exchanger 129 within the heat storage vessel 137. The heat storage vessel 137 contains further an overflow pipe 166, a clamping member 167 for the overflow pipe 166, and a liquid level gauge 168 employing a transparent tube such as a glass tube. Horizontally parallelly spaced pipes 169 and 170 are welded to the heat storage vessel 137, and the liquid level gauge 168 is connected to the pipes 169 and 170 by means of hose joints 171 and 172 of rubber or synthetic resin. The upper end of the heat storage vessel 137 is closed by a cover 173 which is fastened by setscrews to the upper end of the heat storage vessel 137 through a packing 174 interposed therebetween. Legs 175 are welded to the outer bottom surface of the heat storage vessel 137 and are supported above a partition 176 between the heat storage section 101 and the refrigerator section 102 by means of thermally insulating blocks 177 of wood. The thermally insulating blocks 177 prevent the heat stored within the heat storage vessel 137 from escaping externally by conduction. The heat storage section 101 is surrounded by an outer casing 178 which is covered at its upper end by an outer cover 181 which is fastened to the upper end by setscrews through a packing 182 interposed therebetween. The refrigerator section 102 is provided with a front louver 179 and a rear louver 180. There are further provided a cover 183 closing an access opening for the replacement of the heater 139, a decorative plate 184 for the liquid level gauge 168, and a power distribution box 185.

Figure 8:
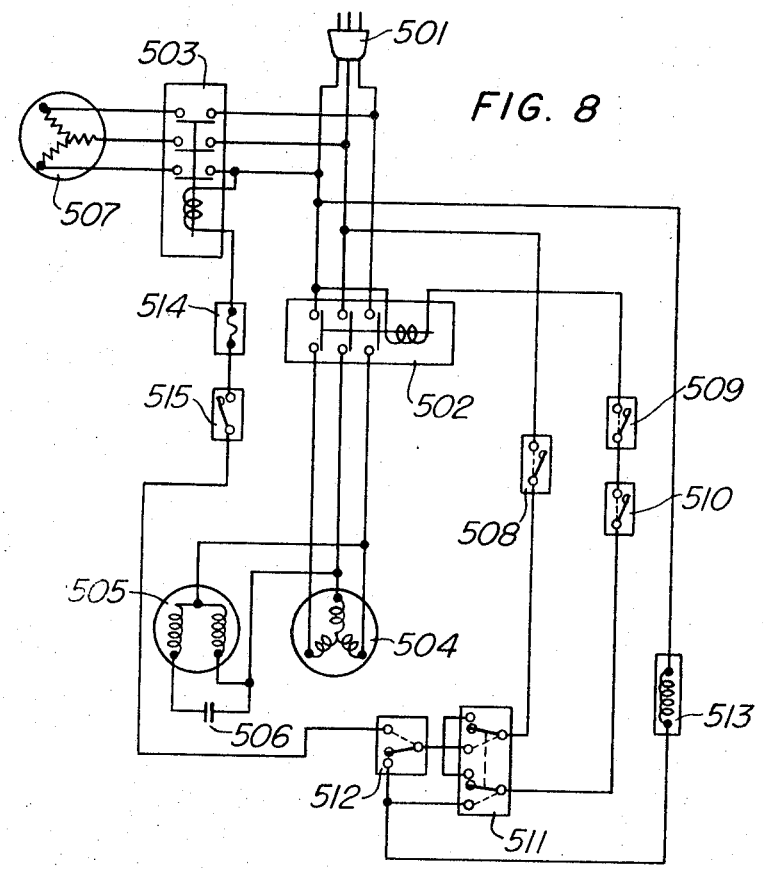
FIG. 8 is an electrical circuit diagram of the apparatus shown in FIG. 1.

An electrical circuit diagram of the cooling and heating apparatus whose structure is described in detail with reference to FIGS. 2, 3 and 4 is illustrated in FIG. 8. The circuit comprises a three-phase power supply 501, an electromagnetic relay 502 for actuating the refrigerating machine, an electromagnetic relay 503 for actuating a heater 507, a motor 504 for driving the compressor, a motor 505 for driving the fan associated with the external heat exchanger, a starting capacitor 506 for the fan motor 505, a main switch 508, a high-pressure switch 509, an antifreeze thermostat 510, a cooling-heating changeover switch 511, a heat pump-heater changeover thermostat 512, an electromagnetic coil 513 of the four-way valve, a temperature fuse 514, and a water temperature regulating thermostat 515.

The operation of the cooling and heating apparatus of the heat storage type according to the present invention will be described with reference to FIGS. 2, 3, 4 and 8. In starting the cooling operation, the main switch 508 is urged to its closed position to energize the electromagnetic relay 502 thereby to place the compressor 504 in operation. Since, in this case, no power is supplied to the electromagnetic coil 513 of the four-way valve, the external heat exchanger 118 in FIG. 2 operates as a condenser, while the internal heat exchanger 129 operates as an evaporator. As a result of the refrigerating operation due to evaporation of the refrigerant within the internal heat exchanger 129, the heat-storing agent 140 around the internal heat exchanger 129 is cooled down until finally a frozen layer appears around the internal heat exchanger 129 as shown by one-dot chain lines in FIGS. 2, 3 and 4. It will be noted in FIG. 4 that the center of the internal heat exchanger 129 is displaced by a distance H from the center of the heat storage vessel 137. Therefore, the space 191 in which the refrigerant inlet pipe 143 and outlet pipe 144 are disposed is wider than the opposite space 192 by a distance of 2H. Thus, a part of the heat-storing agent 140 remains in its liquid state even though the frozen layer extends to substantially occupy the space 192. Accordingly, the heat transfer medium suction pipe 149 which is disposed in the space 191 draws continuously the unfrozen heat-storing agent 140 so that the heat-storing agent 140 is continuously fed into the fan coil unit 16 by the circulating pump. It will thus be understood that the unfrozen portion of the heat-storing agent 140 is utilized as the heat transfer medium for transferring the heat stored in the heat storage vessel 137 to the fan coil unit 16. Therefore, the heat exchange efficiency is far higher than when a heat transfer medium and a heat-storing agent of different nature are used in combination with a double tube type heat exchanger. When the frozen layer grows to an extent that it reaches the temperature sensing element 152 of the antifreeze thermostat 153 disposed on the wall of the heat transfer medium suction pipe 149 as the refrigerating machine continues its operation, the antifreeze thermostat 153 is actuated to automatically stop the operation of the refrigerating machine.

On the other hand, when heating is desired, the cooling-heating changeover switch 511 in FIG. 8 is urged to a position shown by the dotted line for supplying power to the electromagnetic coil 513 of the four-way valve and establishing a heat pump circuit. In other words, the external heat exchanger 118 operates now as an evaporator and the internal heat exchanger 129 operates as a condenser. Therefore, the heat-storing agent 140 contained within the heat storage vessel 137 is heated and its temperature starts to rise. In this connection, the heat pump-heater changeover thermostat 512 in FIG. 8 (which is actually disposed on a suitable portion of the outer wall of the heat storage vessel 137 although not shown in FIGS. 2, 3 and 4) may be preset at a temperature of 50 to 60° C. Thus, the changeover thermostat 512 is automatically actuated to take the position shown by the dotted line when the temperature of the heat-storing agent 140 goes up to 50 to 60° C. so that the heat pump circuit is changed over to a heater circuit. The heat-storing agent 140 is then heated by the heater 507 and its temperature is further increased. When the setting 80 to 85° C. of the water temperature regulating thermostat 515 is reached, the heater circuit is cut off. Thereafter, the circulating pump draws hot water from the heat transfer medium suction pipe 149 as in the cooling operation and feeds it into the fan coil unit 16 for heating the room. The purpose of the provision of the temperature fuse 514 in FIG. 8 is to avoid that the heater 507 burns in the no load state.

It will be understood from the above description that the output of the refrigerating machine in the cooling operation is stored in the form of latent heat of solidification of the heat-storing agent, which in the heating operation, the heat-storing agent is heated by the heat pump and by the heater and the output of the heat pump and the heater is stored in the form of sensible heat so that both can be utilized as an auxiliary output to make up for a deficiency of load to deal with a high cooling or heating load.

The operating characteristics of the cooling and heating heating apparatus of the heat storage type according to the present invention are shown in FIGS. 9 to 12.

Figure 9:
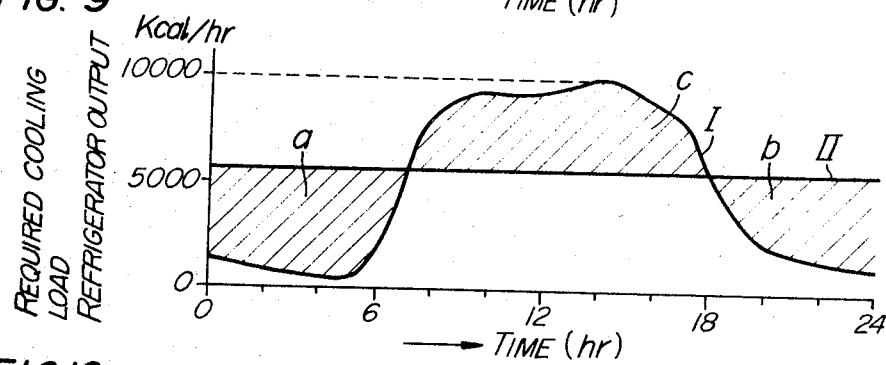
FIG. 9 is a graph showing the relation between the cooling load required during the cooling operation and the output of the refrigerating machine relative to time.

Referring to FIG. 9, the curve I represents a variation in the cooling load relative to time during a day. It will be seen from the curve I that the cooling load increases abruptly as the sun rises at about 6 a.m. and decreases gradually as the sun sets at about 6 p.m. The peak of the cooling load appears at about 2 p.m. and is in the order of 10,000 kilocalories per hour in a room having an area of about 50 square meters. According to the prior art, a cooling apparatus having a refrigerating machine whose output is more than 10,000 kilocalories per hour has been required to deal with such a peak cooling load. However, in the cooling and heating apparatus of the heat storage type according to the present invention, the output of its refrigerating machine may lie at a level shown by the straight line II in FIG. 9. More precisely, the cooling load during a day varies from time to time and shows an abrupt decrease after the sunset. This means that those portions of the refrigerating machine output falling within the ranges $a$ and $b$ are in excess. According to the present invention, the excess in output is utilized to refrigerate the heat-storing agent so as to store it in the form of latent heat or sensible heat.

Figure 10:
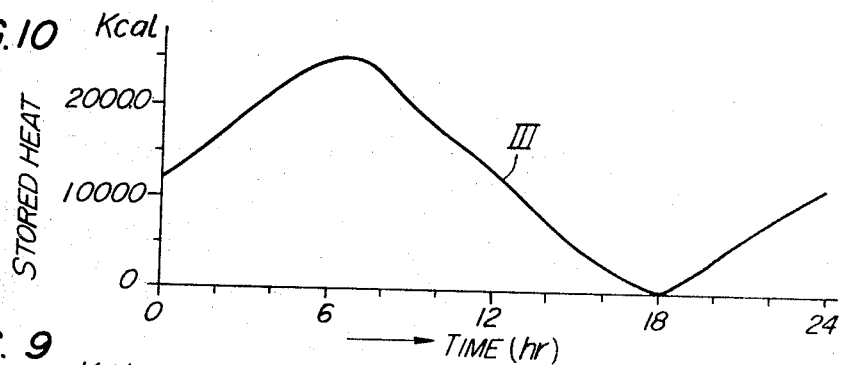
FIG. 10 is a graph showing the quantity of heat stored during the cooling operation relative to time.

Referring to FIG. 10 showing a change in the quantity of heat stored during a day, the quantity of stored heat III starts to increase at about 6 p.m. at which the refrigerating machine output II exceeds the cooling load I. The quantity of stored heat III reaches a maximum at about 6 a.m. at which the refrigerating machine output II becomes substantially equal to the cooling load I, and thence decreases gradually. Thus, between 6 a.m. and 6 p.m., the portion of the refrigerating machine output II falling within the range $c$ in FIG. 9 is deficient to deal with the required cooling load I. According to the present invention, the deficiency is made up by the stored heat III. As apparent from FIG. 9, the present invention is economically advantageous in that the refrigerating machine output II of about one-half the peak cooling load suffices.

Figure 12:
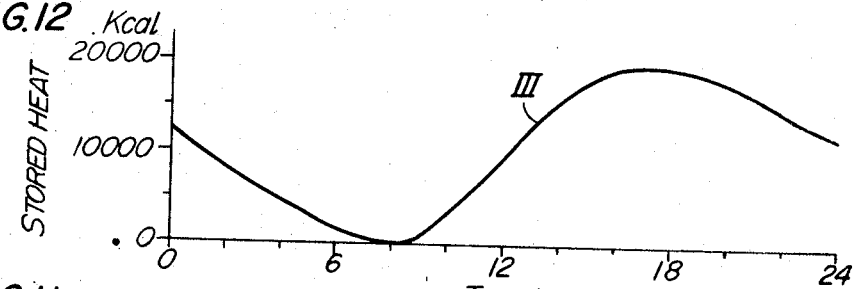
FIG. 12 is a graph showing the quantity of heat stored during the heating operation relative to time.
Figure 11:
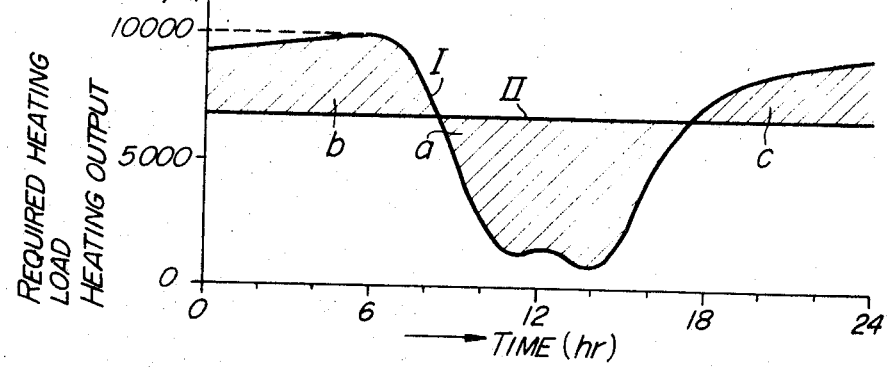
FIG. 11 is a graph showing the relation between the heating load required during the heating operation and the heating output of the apparatus relative to time.

FIG. 11 shows similarly a variation in the heating load I relative to time and the heating output II which is constant. FIG. 12 shows a variation in the quantity of stored heat III during a day. It will be seen that the surplus output falling within the range $a$ is stored to make up for the deficiency represented by the areas $b$ and $c$.

While an embodiment having a single internal heat exchanger within the heat storage vessel has been described here above, another embodiment having two internal heat exchangers will be described with reference to FIG. 13.

Figure 13:
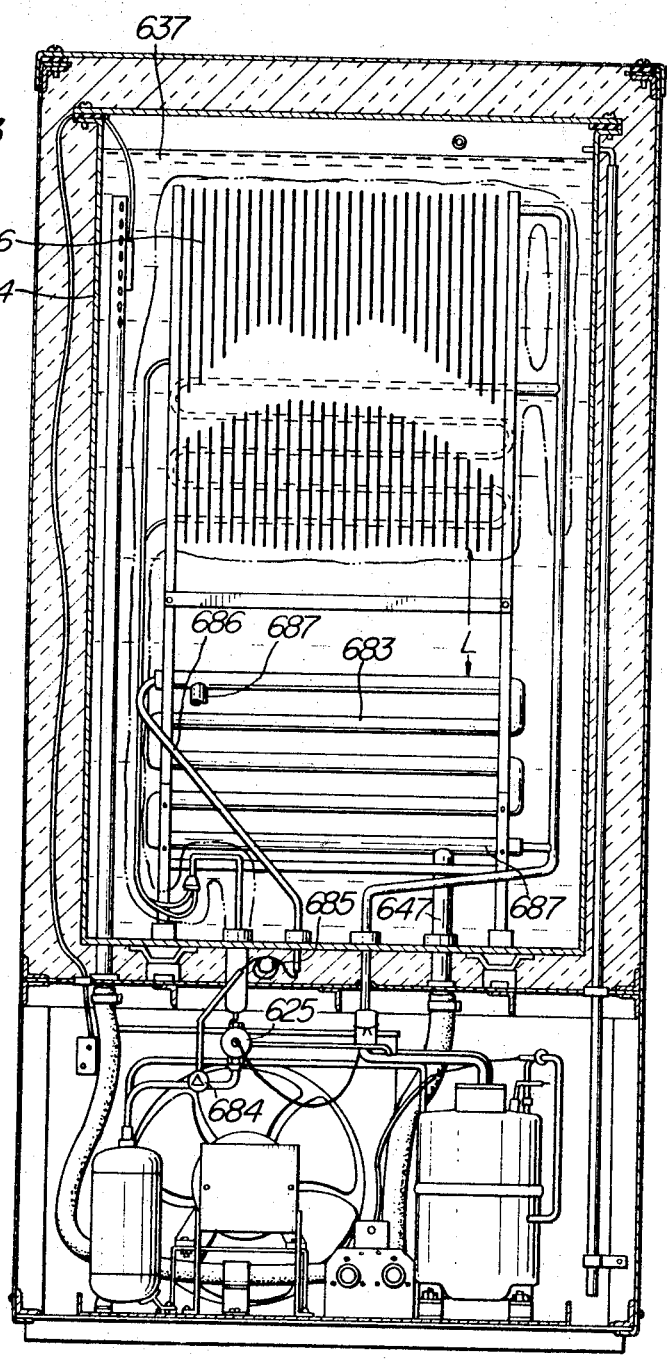
FIG. 13 is a vertical sectional front elevational view of a heat storage section and a refrigerator section in another embodiment of the present invention.

The cooling and heating apparatus shown in FIG. 13 comprises a heat storage vessel 634 which contains therein two internal heat exchangers, that is, a heat exchanger 626 for heat storage and a heat exchanger 683 for water cooling. A three-way solenoid valve 684 is provided to change over the supply to these two heat exchangers. The heat exchanger 626 for heat storage is controlled by a thermostatic expansion valve 625 as in the preceding embodiment so that its evaporation temperature is maintained below 0° C. As a result, a heat-storing agent 637 surrounding the heat exchanger 626 is refrigerated to its frozen state. On the other hand, the heat exchanger 683 for water cooling is controlled by a capillary tube 685 so that its evaporation temperature is maintained above 5° C. The heat exchanger 683 for water cooling is of the double tube type. More precisely, the heat exchanger 683 comprises a double tube whose inner tube 686 serves as a refrigerant passage and whose outer tube 687 serves as a heat transfer medium passage. The heat transfer medium or unfrozen heat-storing agent, which is heated by a fan coil unit, is fed into the double tube through a heat transfer medium discharge pipe 647 and is cooled down while flowing through the double tube to be discharged into the heat storage vessel 634 from an outlet end of the outer tube 687. The heat exchanger 683 for water cooling is spaced apart at a predetermined distance L from the heat exchanger 626 for heat storage. Therefore, the frozen layer produced around the heat exchanger 626 for heat storage does not extend to the heat exchanger 683 for water cooling, and the heat transfer medium flowing through the outer tube 687 will not freeze since the evaporation temperature within the heat exchanger 683 for water cooling is maintained above 5° C. by the capillary tube 685. The structure of the present embodiment is substantially the same as that shown in FIG. 2 except for the above-specified difference. The present embodiment differs also from the preceding embodiment in that it is not provided with the heat pump function and is equipped solely with a heater (not shown).

Figure 14:
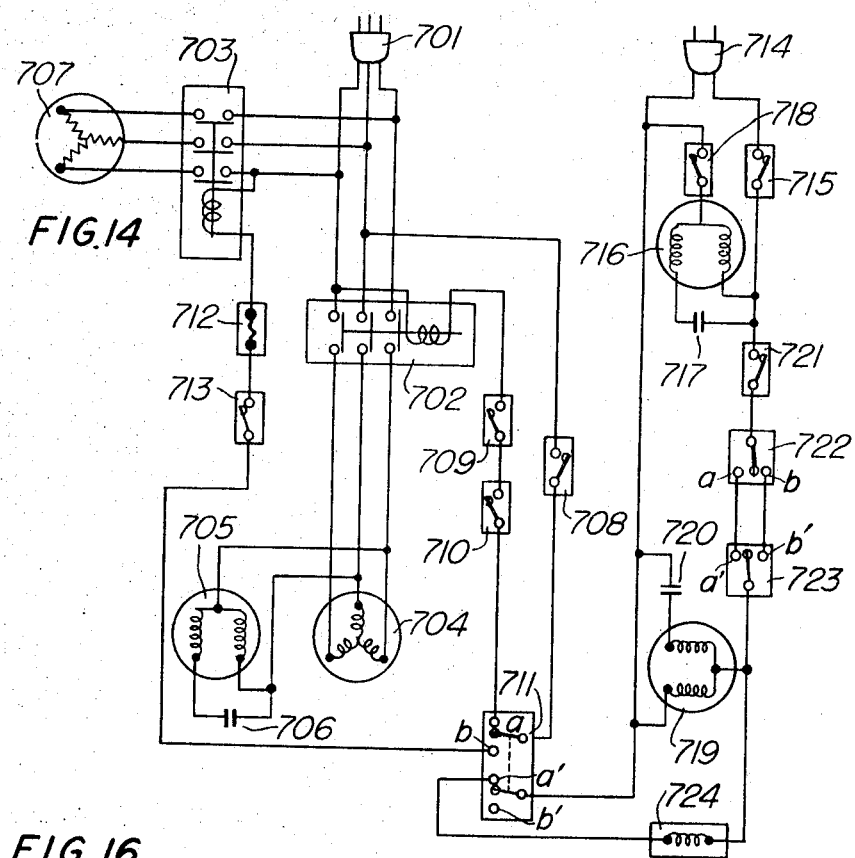
FIG. 14 is an electrical circuit diagram of the apparatus shown in FIG. 13.

One form of the cooling and heating apparatus of the heat storage type having two internal heat exchangers described with reference to FIG. 13 has an electrical circuit arrangement as shown in FIG. 14.

FIG. 14 represents an embodiment in which the three-way valve 684 in FIG. 13 is changed over in interlocked relation with the operation of the circulating pump. The circuit diagram of FIG. 14 is substantially similar to that shown in FIG. 8 in that the circuit comprises a three-phase power supply 701, an electromagnetic relay 702 for energizing the refrigerating machine, an electromagnetic relay 703 for energizing a heater 707, a motor 704 for driving the compressor, a motor 705 for driving the fan for the external heat exchanger, a starting capacitor 706 for the fan motor 705, a main switch 708, a high-pressure switch 709, an antifreeze thermostat 710, a cooling-heating changeover switch 711, a temperature fuse 712 and a water temperature regulating thermostat 713. A circuit associated with the fan coil unit and the circulating pump system comprises a single-phase power supply 714, a main switch 715 for the fan coil unit, a motor 716 for driving the fan in the fan coil unit, a starting capacitor 717 for the fan motor 716, a switch 718 for the fan motor 716, a motor 719 for driving the circulating pump, a starting capacitor 720 for the pump motor 719, a cooling-heating changeover switch 722 in the pump circuit, a thermostat 723 for turning on-off the circulating pump motor 719 by sensing the room temperature, and an electromagnetic coil 724 of the refrigerant circuit changeover three-way valve associated with the two internal heat exchangers shown in FIG. 13.

Referring to FIG. 14, the refrigerating machine starts operating when the main switch 708 is urged to its closed position and the cooling-heating changeover switch 711 is placed in a position $aa'$. At the same time, the main switch 715 in the circuit associated with the fan coil unit is urged to its closed position and the fan switch 718 is also closed to drive the fan. Then, the pump switch 721 is closed and the cooling-heating changeover switch 722 is placed in a position $a$ to place the circuit in cooling operation. When the room temperature is high, the thermostat 723 sensing the room temperature is in its position $a'$. Therefore, the pump motor 719 is driven, and at the same time, current is supplied to the electromagnetic coil 724 of the three-way valve so that the refrigerant circuit is now connected with the heat exchanger for water cooling and the apparatus functions as a water cooler. When the room temperature is reduced thereafter, the thermostat 723 is changed over to a position $b'$ to cut off the pump circuit. At the same time, current supply to the electromagnetic coil 724 of the three-way valve is cut off and the refrigerant circuit is now connected with the heat exchanger for heat storage so that the apparatus functions as a heat storage means. It will be understood that, since on-off of the circulating pump motor 719 is interlocked with on-off of the electromagnetic coil 724 of the three-way valve, the heat exchanger for water cooling is in operation while the circulating pump motor 719 is in operation and the heat exchanger for heat storage is in operation while the pump motor 719 is at rest so as to freeze the heat-storing agent for effecting the storage of heat. When the frozen layer grows too much due to continuous storage of heat, the antifreeze thermostat is actuated to stop the operation of the refrigerating machine as in the preceding embodiment.

In the heating operation, the cooling-heating changeover switch 711 is changed over to a position $bb'$ for supplying current to the heater 707. Also, the changeover switch 722 in the circuit associated with the circulating pump is changed over to a position $b$ in the heating operation. When the room temperature rises above a predetermined setting, the thermostat 723 sensing the room temperature is urged to the position $a'$ for cutting off the pump circuit. Conversely, when the room temperature goes down below the predetermined setting, the thermostat 723 is urged to its position $b'$ again for establishing the pump circuit. In this case, the electromagnetic coil 724 of the three-way valve is independent of the pump circuit.

A modification of the circuit arrangement illustrated in FIG. 14 is shown in FIG. 15 and additionally comprises a thermostat 825 for turning on-off the three-way valve circuit by sensing the temperature of the heat transfer medium leaving the fan coil unit. Elements 801 through 824 in FIG. 15 are entirely the same as the corresponding elements 701 through 724 shown in FIG. 14. The thermostat 825 is provided to deal with such a situation as described below. That is, in spite of the fact that the circulating pump motor 819 is in operation, current is supplied to the electromagnetic coil 824 of the three-way valve and the heat exchanger for water cooling is in operation, the operation of the refrigerating machine would not attain the required cooling effect if the amount of heat exchange in the fan coil unit is small and the temperature of the heat transfer medium leaving the fan coil unit is low. In such a situation, the thermostat 825 is actuated to cut off the circuit including the electromagnetic coil 824 of the three-way valve and to connect the refrigerant circuit with the heat exchanger for heat storage.

Figure 16:
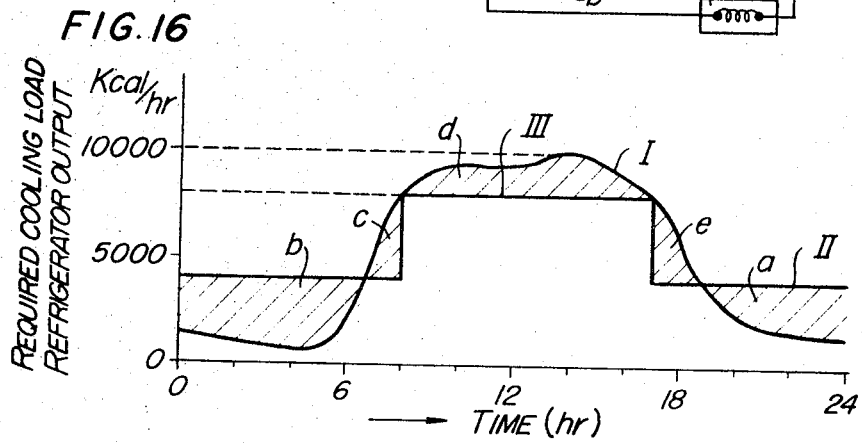
FIG. 16 is a graph showing the relation between the cooling load required during the cooling operation and the output of the refrigerating machine relative to time in the embodiment shown in FIG. 15.

The operating characteristics of the cooling and heating apparatus of the heat storage type having two internal heat exchangers shown in FIG. 13 are illustrated in FIGS. 16 and 17. Referring to FIG. 16, the curve I represents a variation in cooling load relative to time during a day, the level II represents the output of the refrigerating machine when operated in combination with the heat exchanger for heat storage, and the level III represents the output of the refrigerating machine when operated in combination with the heat exchanger for water cooling. There is naturally a difference between the output of the refrigerating machine when operated in combination with the heat exchanger for heat storage and the output of the refrigerating machine when operated in combination with the heat exchanger for water cooling because these heat exchangers have different evaporation temperatures. That is, the output of the refrigerating machine is higher when operated in combination with the heat exchanger for water cooling in which evaporation takes place at a higher temperature. As apparent from FIG. 16, the surplus output portions falling within the ranges $a$ and $b$ are stored to make up for the deficiency of the output falling within the ranges $c$, $d$ and $e$. The quantity of stored heat varies in a manner as shown in FIG. 17, in which the curve IV represents a variation in the quantity of stored heat in the case of the apparatus equipped with two internal heat exchangers shown in FIG. 13 and the curve V represents a variation in the quantity of stored heat in the case of the apparatus equipped with a single internal heat exchanger shown in FIGS. 2 to 4 and is similar to the curve III shown in FIG. 10. From FIG. 17 it will be seen that the total quantity of heat that should be stored is less in the apparatus equipped with two heat exchangers than in the apparatus equipped with a single heat exchanger.

We claim:

1. A cooling and heating apparatus of the heat storage type comprising a thermally insulated heat storage vessel containing therein a heat-storing agent, heat exchanger means for effecting heat exchange with said heat-storing agent, a heater for heating said heat-storing agent, and means for sensing the freezing of said heat-storing agent, a refrigerating machine connected with said heat exchanger means by conduit means, and a fan coil unit for deriving heat from said heat-storing agent for effecting the cooling and heating of a room.

2. A cooling and heating apparatus of the heat storage type according to claim 1, in which said refrigerating machine is of the heat pump type so that, in the case of heating, it cooperates with said heater for heating said heat-storing agent within said heat storage vessel.

3. A cooling and heating apparatus of the heat storage type according to claim 1, in which said heat exchanger means comprises a low-temperature evaporator and a high-temperature evaporator which is sufficiently spaced apart from said low-temperature evaporator so that a frozen layer of said heat-storing agent formed by said low-temperature evaporator may not extend to said high-temperature evaporator, said high-temperature evaporator being of the double tube type having an inner tube for leading the refrigerant therethrough and an outer tube concentric with said inner tube for leading the heat transfer medium therethrough.

4. A cooling and heating apparatus of the heat storage type according to claim 1, in which said heat exchanger means is disposed within said heat storage vessel in such a relation that it is spaced a predetermined distance from the inner wall of said heat storage vessel, so that an unfrozen portion is left between said heat exchanger means and the inner wall of said heat storage vessel when said heat-storing agent is solidified to store heat therein.

5. A cooling and heating apparatus of the heat storage type according to claim 1, in which the end opening of a discharge pipe for supplying said heat-storing agent to other equipment and the end opening of a suction pipe for said heat-storing agent are disposed within said heat storage vessel in such a relation that they are spaced a predetermined distance from said heat exchanger means.

6. A cooling and heating apparatus of the heat storage type according to claim 1, in which said freeze sensing means comprises a thermostat and its temperature sensing element is disposed adjacent to the end opening of a heat transfer medium discharge pipe disposed within said heat storage vessel.

7. A cooling and heating apparatus of the heat storage type according to claim 3, in which means operative by detecting the temperature of the heat transfer medium leaving said fan coil unit to automatically control a valve means is provided to change over the refrigerant path from a position in which it is connected with said low-temperature evaporator to a position in which it is connected with said high-temperature evaporator and vice versa.

8. A cooling and heating apparatus of the heat storage type according to claim 1, in which said heat-storing agent is water.

9. A cooling and heating apparatus of the heat storage type according to claim 3, in which said apparatus is so arranged that the refrigerant path is changed over from a position in which it is connected with said high-temperature evaporator when cooling operation is performed to a position in which it is connected with said low-temperature evaporator when cooling operation is not performed and vice versa.

10. A cooling and heating apparatus of the heat storage type comprising, in combination, a thermally insulated heat storage vessel, a heat-storing agent contained therein, first heat exchanger means, said first heat exchanger means disposed in said heat storage vessel for effecting heat exchange with said heat-storing agent; heat pump means comprising, in combination, a compressor, second heat exchanger means operatively connected to said compressor and said first heat exchanger means, and valve means operatively connected to said compressor to control the direction of flow of refrigerant through said first and second heat exchanger means; temperature sensing means for sensing the freezing of said heat-storing agent, said temperature sensing means operatively connected to control the operation of said compressor; and a fan coil unit operatively connected to said heat storage vessel for deriving heat from said heat-storing agent.

11. The cooling and heating apparatus of claim 10, wherein a longitudinal axis of said first heat exchanger is spaced apart a predetermined distance from a generally parallel longitudinal axis of said heat storage vessel.

12. The cooling and heating apparatus of claim 10, further comprising pipe means disposed in said heat storage vessel, one end thereof being open to permit the flow of heat-storing agent thereinto; and wherein said temperature sensing means comprises a thermostat and a temperature sensing element operatively connected thereto, said element being disposed adjacent to said open end of said pipe means.